US011363821B2

(12) United States Patent
Pietarinen et al.

(10) Patent No.: US 11,363,821 B2
(45) Date of Patent: Jun. 21, 2022

(54) USE OF A LIGNIN FRACTION AS AN ANTI-PHYTOPATHOGENIC AGENT AND ANTI-PHYTOPATHOGENIC COMPOSITIONS COMPRISING THE SAME

(71) Applicants: UPM-KYMMENE CORPORATION, Helsinki (FI); GREEN INNOVATION GMBH, Innsbruck (AT)

(72) Inventors: Suvi Pietarinen, Helsinki (FI); Christian Hübsch, Helsinki (FI); Giuliano Leonardi, Innsbruck (AT)

(73) Assignees: UPM-KYMMENE CORPORATION, Helsinki (FI); GREEN INNOVATION GMBH, Innsbruck (AT)

( * ) Notice: Subject to any disclaimer, the term of this patent is extended or adjusted under 35 U.S.C. 154(b) by 714 days.

(21) Appl. No.: 16/314,714

(22) PCT Filed: Jun. 26, 2017

(86) PCT No.: PCT/EP2017/065652
§ 371 (c)(1),
(2) Date: Jan. 2, 2019

(87) PCT Pub. No.: WO2018/001935
PCT Pub. Date: Jan. 4, 2018

(65) Prior Publication Data
US 2019/0313648 A1 Oct. 17, 2019

(30) Foreign Application Priority Data
Jul. 1, 2016 (IT) .................. 102016000068623

(51) Int. Cl.
*A01N 65/00* (2009.01)
*C08H 7/00* (2011.01)
*C07G 1/00* (2011.01)

(52) U.S. Cl.
CPC ............... *A01N 65/00* (2013.01); *C07G 1/00* (2013.01); *C08H 6/00* (2013.01)

(58) Field of Classification Search
None
See application file for complete search history.

(56) References Cited

FOREIGN PATENT DOCUMENTS

WO    WO2013182751 A1    12/2013

OTHER PUBLICATIONS

U.S. Appl. No. 17/252,879, filed Dec. 2020, Leonardi, et al.*
U.S. Appl. No. 17/415,873, filed Jun. 2021, Hubsch, et al.*
Dizhbite, et al.; "Characterization of the radical scavenging activity of lignins—natural antioxidants"; Latvia; Jan. 30, 2004.
Rogosic, et al.; "Polydispersity Index and Molecular Weight Distributions of Polymers"; Croatia; Jul. 3, 1995.

* cited by examiner

*Primary Examiner* — Michael Barker
(74) *Attorney, Agent, or Firm* — Dickinson Wright PLLC; Andrew D. Dorisio

(57) ABSTRACT

The use of a lignin fraction as an anti-phytopathogenic agent, anti-phytopathogenic compositions comprising the same, as well as methods of protecting plants against phytopathogens, are disclosed.

15 Claims, No Drawings

USE OF A LIGNIN FRACTION AS AN ANTI-PHYTOPATHOGENIC AGENT AND ANTI-PHYTOPATHOGENIC COMPOSITIONS COMPRISING THE SAME

FIELD OF THE INVENTION

The present invention concerns the use of a lignin fraction as an anti-phytopathogenic agent, anti-phytopathogenic compositions comprising the same, as well as methods of protecting plants against phytopathogens.

STATE OF THE ART

Plant diseases can be difficult to diagnose. So often, they display the same symptoms as plants that are perfectly healthy. When a plant is diseased, it is because of a bacteria, fungus, or virus.

Bacteria

Not all bacteria are bad for plants and soil. However, there are approximately 200 types of bacteria that cause diseases in plants. They are most active in warm and humid environments. There are several symptoms of bacterial infection. One is leaf spot. In this case, the bacteria that attacks the plants, produces a toxic chemical that kills the surrounding plant cells. The plant then reacts defensively by killing off the surrounding plant cells, thereby isolating the infected cells. In some cases, these dead cell areas drop out, creating what looks like "shot holes" in the leaves.

Bacteria can clog the plants ability to deliver water and nutrients to the rest of the plant. Eventually the plant begins to wilt or droop. This process can occur rapidly, and within one day.

Other symptoms cause the plant tissue decline, such as in cankers and soft rot, which are sunken areas produced by dead plant tissue. In other cases, abnormal growth is the symptom, referred to as galls. Plants respond to these bacterial invasions by producing a rapid abundance of new cells.

Bacteria can spread in several ways, including insects, splashing water, other diseased plants, or tools. They enter plants through tiny openings either through damage, or cuts, but also through natural opens in the plant itself.

Once plants are affected, they can be difficult to control.

Fungi

Like bacteria, many more fungi are actually good, but, unlike bacteria, there are thousands of fungi that are harmful to plants. Because fungi are present in the soil and above ground, symptoms of fungal attack can appear above and below ground. These include rotting or dead roots, or large swelling on roots below ground. At the soil level, new seedling stems can rot and flop over. Above the soil line, plants can display leaf spots, mildews (white or grey powdery patches on foliage), rusts, and wilts. Fungal spores are very small and light, and can travel great distances through the air to infect other plants or trees. They are also spread by water, animals and insects, and people.

Viruses

Even viruses on occasion can be beneficial, but for the most part, they are not. They can persist for many years, before they appear as a problem, and when they do, they often show up in one of a few primary ways. First, plant foliage may appear yellow, or they may appear as mosaic patches of yellow, light green, or white. Next, the plant may appear stunted. In addition, the plants are often misshapen or malformed. Specifically, the leaves may be rolled, or swollen or puckered, or they may be abnormally narrow. Unlike bacteria and fungi, viruses are not spread by water or wind. Instead, they must physically enter the plant. One of the most common vectors of viruses are insects. Insects feed on infected plants and transmit the viruses to healthy plants when they feed again. Other ways include plant propagation, contact by humans, and infected seed. Unfortunately, once infected, there are no chemical treatments for eliminating a virus. Once detected, you should remove all suspected plants. Although this can seem like drastic measures, it is the most effective way to reduce continued spread.

It is therefore felt the need to effectively counteract these microorganisms, while at the same time preserving the plants and the environment as well as being easy to use and safe for the users.

SUMMARY OF THE INVENTION

The above object has been achieved by the use of a lignin fraction as an anti-phytopathogenic agent, as claimed in claim 1.

In this regard, the present invention also concerns a method of protecting plants against phytopathogens, said method comprising the steps of:
 i) providing the lignin fraction of the invention, and
 ii) applying the lignin fraction to a plant or plant soil.

In another aspect, the present invention concerns anti-phytopathogenic compositions comprising said lignin fraction and suitable agro-chemical additives.

In a further aspect, the present invention also concerns a method of protecting plants against phytopathogens, said method comprising the steps of:
 a) providing the anti-phytopathogenic composition of the invention, and
 b) applying the anti-phytopathogenic composition to a plant or plant soil.

The characteristics and the advantages of the present invention will become apparent from the following detailed description, and from the working examples provided for illustrative purposes.

DETAILED DESCRIPTION OF THE INVENTION

The subject of the invention therefore is the use of a lignin fraction as an anti-phytopathogenic agent, wherein said lignin fraction comprises fragments having a weight average molecular weight up to 6,000 Daltons, as measured by Size-Exclusion Chromatography.

Lignin is a class of complex organic polymers that form important structural materials in the support tissues of some algae, vascular plants, included their bark, and herbaceous plants, such as wood (i.e. softwood and hardwood), straw of all cereals, cane bagasse, grass, linen, jute, hemp, or cotton. Lignin can also have mineral source, such as peat, leonardite and coal.

Chemically, lignin is a very irregular, randomly cross-linked polymer of phenylpropane units joined by many different linkages, with a weight average molecular weight of 20,000 Daltons or higher. Said polymer is the result of an enzyme-mediated dehydrogenative polymerization of three phenylpropanoid monomer precursors, i.e. coniferyl, synapyl and coumaryl alcohols.

Coniferyl alcohol occurs in all species and is the dominant monomer in conifers (softwoods). Deciduous (hardwood) species contain up to 40% syringyl alcohol units while grasses and agricultural crops may also contain coumaryl alcohol units.

A representative and illustrative lignin fragment (I) containing the most important bonding patterns is shown herein below:
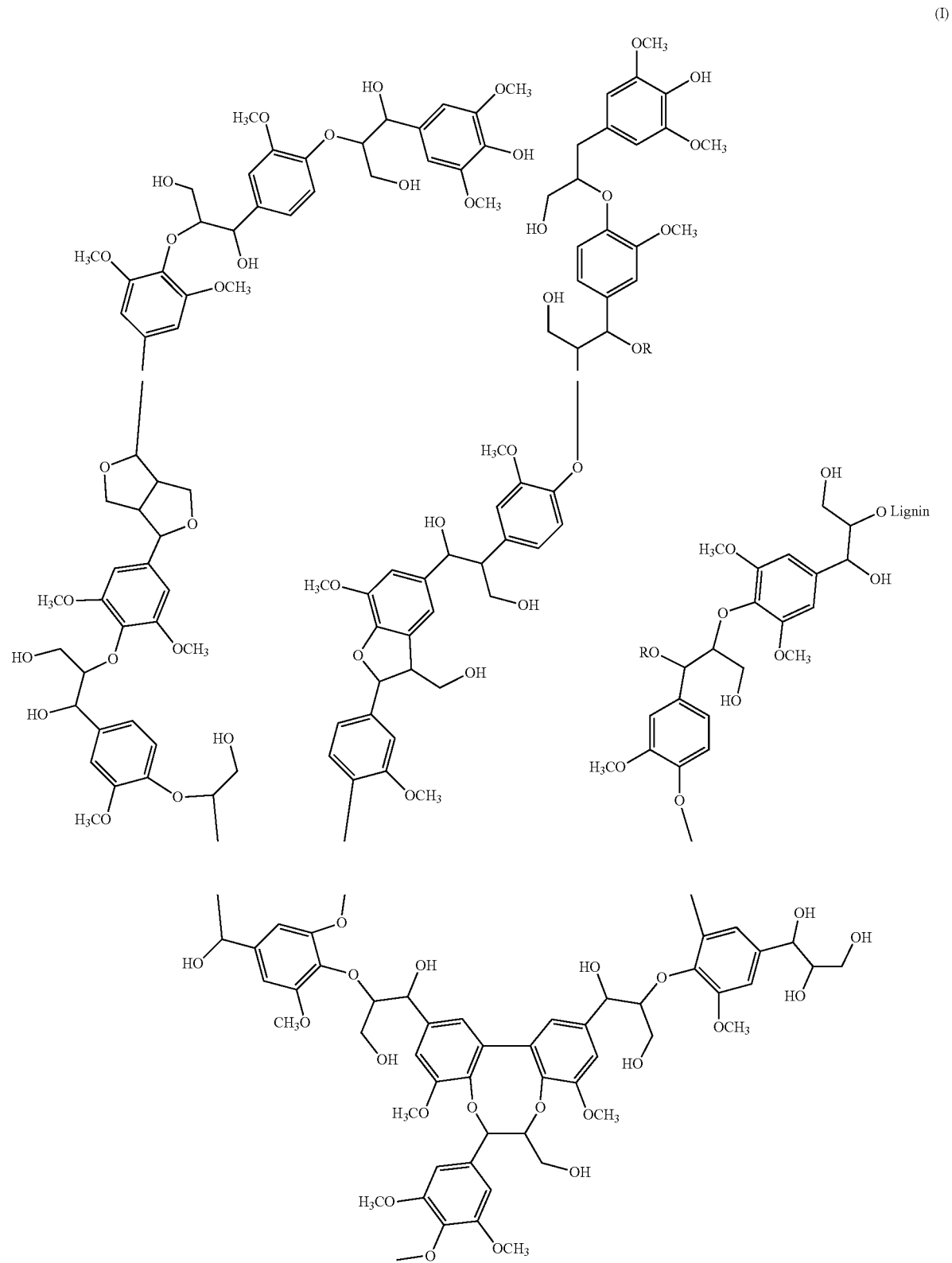

Lignin can be categorized to softwood and hardwood lignins according to their raw biomass sources.

Raw biomass sources that can be suitable starting materials for obtaining the relevant lignin fraction are any lignin including essentially pure lignin as well as kraft lignin, biomass originating lignin, lignin from alkaline pulping process, lignin from soda process, lignin from organosolv pulping and any combination thereof.

By the expression "essentially pure lignin", it should be understood as at least 90% pure lignin, preferably at least 95% pure lignin, the remainder being extractives and carbohydrates such as hemicelluloses as well as inorganic matter.

By the expression "kraft lignin", it is to be understood lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different techniques including e.g. precipitation and filtration. Lignin usually begins precipitating at pH values below 11-12. Different pH values can be used in order to precipitate lignin fractions with different properties. These lignin fractions may differ from each other by molecular weight distribution, e.g. $M_w$ and $M_n$, polydispersity, hemicellulose and extractive contents, contents of inorganic material. The precipitated lignin can be purified from inorganic impurities, hemicellulose and wood extractives using acidic washing steps. Further purification can be achieved by filtration. Alternatively, the lignin is separated from pure biomass. The separation process can begin with liquidizing the biomass with strong alkali followed by a neutralization process. After the alkali treatment, the lignin can be precipitated in a similar manner as presented above.

Alternatively, the separation of lignin from biomass comprises a step of enzyme treatment. The enzyme treatment modifies the lignin to be extracted from biomass. Lignin separated from pure biomass is essentially sulphur-free (sulphur content less than 3%) and thus valuable in further processing.

Preferably, the lignin so separated is also subjected to a depolymerization process in order to further reduce the weight average molecular weight of fragments. Preferably, the lignin so separated is also subjected to a depolymerization process in order to further reduce the weight and number average molecular weights of fragments.

Suitable depolymerization processes include base-catalyzed depolymerization, acid-catalyzed depolymerization, metallic catalyzed depolymerization, ionic liquids-assisted depolymerization, and supercritical fluids-assisted lignin depolymerization.

In preferred embodiments, said lignin fraction is obtained by base-catalyzed depolymerization.

Preferably, said lignin fraction is obtained by subjecting the separated lignin to a base-catalyzed depolymerization at a temperature lower than 300° C. and a pressure lower than 30 MPa.

The pH is set between 11 and 14, by adding a base such as NaOH, KOH, $Ca(OH)_2$, LiOH, $K_2CO_3$, or a mixture thereof.

For the purposes of the present invention, the weight average molecular weight ($M_w$) of fragments in the lignin fraction is measured by Size-Exclusion Chromatography (or 'SEC'). SEC employs a stagnant liquid present in the pores of beads as the stationary phase, and a flowing liquid as the mobile phase. The mobile phase can therefore flow between the beads and also in and out of the pores in the beads. The separation mechanism is based on the size of the polymer molecules in solution. Bigger molecules will elute first. Small molecules that can enter many pores in the beads take a long time to pass through the column and therefore exit the column slowly. To determine the molecular weights of the components of a polymer sample, a calibration with standard polymers of known weight must be performed. Values from the unknown sample are then compared with the calibration graph. The retention times depends on the used column material, eluent and how similar the used standards are compared to the samples. In the present invention, the eluent is preferably 0.1 M NaOH.

The lignin fraction of the invention has unexpectedly and surprisingly proved to be very effective against phytopathogens affecting plants and crops, even at concentrations conveniently low, as it will be shown in the Examples.

For the purposes of the present invention, with the term "phytopathogen" it is meant an organism parasitic on a plant host thus causing soil-borne disease or an infection, said organism being a bacterium, fungus, oomycetes, or virus.

The term "plant" denotes a plant or plants that can be grown and harvested for profit or subsistence, thus including crops, cereals, vegetables, fruits, and flowers, as well as grown and harvested for gardening or personal use.

The term "plant soil" denotes the soil where the plant is growing or where the plant is sowed or where the plant will be sowed, thus including grounds, lands, and soilless media, such as in hydroculture and hydroponics.

Particularly, this lignin fraction can be used as an anti-phytopathogenic agent against a bacterium, fungus, oomycetes, or virus.

In this regard, this lignin fraction can be used as an anti-phytopathogenic agent against bacteria, such as *Erwinia amylovora, Pseudomonas syringae, Xanthomonas arboricola, Xanthomonas campestris*, against pathogenic fungi, such as *Botrytis cinerea, Cercospora beticola, Zymoseptoria tritici, Fusarium solani, Alternaria solani, Rhizoctonia solani, Monilia laxa, Anthracnose of turfgrass, Apple powdery mildew, Apple scab, Black knot, Black sigatoka, Blackleg of oilseed rape, Brown rot of stone fruits, Dollar spot of turfgrass, Dutch elm disease, Early blight of Potato and Tomato, Ergot of rye, Fusarium head blight, Fusarium wilt of watermelon and other cucurbits, Leucostoma canker of stone fruits, Monosporascus root rot, Mummy Berry, Rice blast, Septoria tritici blotch (STB) of wheat, Sudden death syndrome of soybean, Take-all root rot, Tan spot of cereals, Verticillium wilt, White mold (Sclerotinia), Armillaria root disease, shoestring root rot, Brown root rot, Coffee rust, Common smut of corn, Daylily rust, Rhizoctonia diseases of turfgrass, Southern blight, southern stem blight, white mold, Soybean rust, Stem rust of wheat, Stinking smut of wheat, Wheat Stem Rust, White pine blister rust*, against oomycetes, such as *Phytophthora infestans, Plasmopara viticola, Aphanomyces root rot or common root rot of legumes, Black shank of tobacco, Downy mildew of cucurbits, Downy mildew of grape, Late blight of potato and tomato, Phytophthora blight of cucurbits, Phytophthora root and stem rot of soybean, Pythium blight of turfgrass, Sudden oak death and ramorum blight, Taro leaf blight, Rapid Blight of Turfgrass*, and against viruses, including viroids and virus-like organisms. Most plant viruses have small, single-stranded RNA genomes. However, some plant viruses also have double stranded RNA or single or double stranded DNA genomes. These genomes may encode only three or four proteins: a replicase, a coat protein, a movement protein, in order to allow cell to cell movement through plasmodesmata, and sometimes a protein that allows transmission by a vector. Plant viruses can have several more proteins and employ many different molecular translation methods.

Plant viruses are generally transmitted from plant to plant by a vector, but mechanical and seed transmission also occur. Vector transmission is often by an insect (for example, aphids), but some fungi, nematodes, and protozoa have been shown to be viral vectors. In many cases, the insect and virus are specific for virus transmission such as the beet leafhopper that transmits the curly top virus causing disease in several crop plants.

Preferably, said lignin fraction comprises fragments having a weight average molecular weight up to 5,500 Daltons.

In preferred embodiments, said lignin fraction comprises fragments having a weight average molecular weight up to 5,000 Daltons.

In some embodiments, said lignin fraction comprises fragments having a weight average molecular weight down to 90 Daltons.

In preferred embodiments, said lignin fraction comprises fragments having a weight average molecular weight of 90 Daltons to 6,000 Daltons, preferably having a weight average molecular weight of 90 Daltons to 5,500 Daltons, more preferably having a weight average molecular weight of 90 Daltons to 5,000 Daltons.

Preferably in these embodiments, said fragments comprise up to 33 phenylpropane units on weight average, more preferably, up to 28 phenylpropane units on weight average. The molecular weight of the three phenylpropanoid monomer precursors varies between 150 Da of coumaryl alcohol, 180 Da of coniferyl alcohol, and 210 g/mol of syringyl alcohol. The average weight is therefore 180 Da and this value has been used as "phenylpropane unit". The $M_w$ values have been divided by 180 Da, thus obtaining the phenylpropane unit numbers on weight average.

Particularly preferred embodiments are those wherein said lignin fraction comprises fragments having a weight average molecular weight of 90 Daltons to 5,000 Daltons in and 1 to 28 phenylpropane units on weight average.

In other embodiments, the lignin fraction comprises fragments having a number average molecular weight ($M_n$) up to 2,000 Daltons.

For the purposes of the present invention, the number average molecular weight ($M_n$) of fragments in the lignin fraction is measured by Size-Exclusion Chromatography. Preferably, the lignin fraction comprises fragments having a number average molecular weight ($M_n$) up to 1,500 Daltons.

Without wishing to be bound by any theory, it is believed that lower number average molecular weights mean more active molecules. This is put forward considering that lower molecular weights mean smaller fragments, and smaller fragments mean less crosslinked/shorter fragments, and less crosslinked/shorter fragments mean a higher number of free functional groups thereon, thus more reactive fragments.

Moreover, it is believed that smaller molecules can easily pass through the cell membrane of phytopathogens and diffuse therewithin, thus significantly increasing the overall effectiveness of the lignin fraction.

Preferably in these embodiments, said fragments comprise up to 15 phenylpropane units on number average, more preferably, up to 9 phenylpropane units on number average. The molecular weight of the three phenylpropanoid monomer precursors varies between 150 Da of coumaryl alcohol, 180 Da of coniferyl alcohol, and 210 g/mol of syringyl alcohol. The average weight is therefore 180 Da and this value has been used as "phenylpropane unit". The $M_n$ values have been divided by 180 Da, thus obtaining the phenylpropane unit numbers on number average.

In preferred embodiments, said lignin fraction comprises fragments having a weight average molecular weight ($M_w$) of 90 Daltons to 5,000 Daltons, and fragments having a number average molecular weight ($M_n$) up to 1,500 Daltons.

More preferably, said lignin fraction comprises fragments having a weight average molecular weight ($M_w$) of 90 Daltons to 5,000 Daltons and 1 to 28 phenylpropane units on weight average, and fragments having a number average molecular weight ($M_n$) up to 1,500 Daltons and up to 11 phenylpropane units on number average.

In further embodiments, the lignin fraction has a polydispersity index (PDI) of 2 to 6. The polydispersity index (PDI) or heterogeneity index, or simply dispersity, is a measure of the distribution of molecular mass in a given polymer sample. PDI is the weight average molecular weight ($M_w$) divided by the number average molecular weight ($M_a$). It indicates the distribution of individual molecular masses in a batch of polymers.

Particularly preferred embodiments are those wherein said lignin fraction comprises fragments having a weight average molecular weight ($M_w$) of 90 Daltons to 5,000 Daltons and 1 to 28 phenylpropane units on weight average, and wherein said lignin fraction has a polydispersity index of 2 to 6.

Particularly preferred embodiments are also those wherein said lignin fraction comprises fragments having a number average molecular weight ($M_n$) up to 2,000 Daltons and up to 11 phenylpropane units on number average, and wherein said lignin fraction has a polydispersity index of 2 to 6.

The most preferred embodiments are those wherein said lignin fraction comprises fragments having a weight average molecular weight ($M_w$) of 90 Daltons to 5,000 Daltons and 1 to 28 phenylpropane units on weight average, a number average molecular weight ($M_n$) up to 2,000 Daltons and up to 11 phenylpropane units on number average, and wherein said lignin fraction has a polydispersity index of 2 to 6.

The lignin fraction is effective even at very small amounts, i.e. at a quantity lower than 20,000 grams/ha, preferably lower than 5,000 grams/ha, more preferably a quantity of 2,000-4,000 grams/ha.

The lignin fraction can be in a solid or liquid form.

When the lignin fraction is in a solid form, said solid form can be tablet, mini-tablet, micro-tablet, granule, microgranule, pellet, multiparticulate, micronized particulate, or powder.

When the lignin fraction is in a liquid form, said liquid form is a solvent solution.

Suitable solvents are water, glycols, alcohols, polyalcohols, aldehydes, ketones, organic acids, DMSO, and combinations thereof.

Preferred solvents are water, methanol, ethanol, n-propanol, iso-propanol, n-butanol, isobutanol, allyl alcohol, 1,2-propylene glycol, 1,3-propylene glycol, 1,2-ethylene glycol, polyethylene glycol (PEG), benzyl alcohol, glycerol, acetone, lactic acid, polylactic acid, DMSO, and mixtures thereof.

More preferred solvents are water, 1,2-propylene glycol, 1,3-propylene glycol, 1,2-ethylene glycol, polyethylene glycol (PEG), and mixtures thereof.

In the most preferred embodiments, the solvent is water.

Preferably, the lignin fraction as an anti-phytopathogenic agent is used in a concentration of less than 1,000 g/100 l of solvent, more preferably less than 500 g/100 l of solvent.

The invention also concerns a method of protecting plants against phytopathogens, said method comprising the steps of:

i) providing the lignin fraction as above described,
ii) applying the lignin fraction to a plant or plant soil.

In step i), the lignin fraction is provided in a solid or liquid form, as above described.

In step ii), the lignin fraction can be applied as such, i.e. in the form provided in step i), or can be preliminarily diluted in water.

In some embodiments, in step ii), the lignin fraction is in a solid form, e.g. in a powder form, and is spread as such on a plant or plant soil.

In other embodiments, the application of the lignin fraction, in step ii), is performed by diluting in water the lignin fraction provided in step i), and spraying the resulting solution on a plant, at different times during the development of the plants, according to the parameters of pathogen growth, or on plant soil, e.g. before or upon sowing. More preferably, the lignin fraction is diluted in water at a concentration of less than 1,000 g/100 l of water, preferably less than 500 g/100 l of water.

Preferably, the lignin fraction is applied at least once a year.

More preferably, the lignin fraction is applied 1-10 times a year to a plant.

In preferred embodiments of the method, the lignin fraction in step ii) is applied to a plant at a quantity lower than 20,000 grams/ha, preferably lower than 5,000 grams/ha, more preferably at a quantity of 2,000-4,000 grams/ha. In particularly preferred embodiments, the lignin fraction of step ii) is applied to a plant at a quantity of 3,000 grams/ha.

More preferably, the lignin fraction is applied 1-3 times a year to plant soil.

In preferred embodiments of the method, the lignin fraction in step ii) is applied to plant soil at a quantity lower than 100,000 grams/ha, preferably lower than 50,000 grams/ha, more preferably at a quantity of 20,000-40,000 grams/ha. In particularly preferred embodiments, the lignin fraction of step ii) is applied to plant soil at a quantity of 30,000 grams/ha.

The lignin fraction can be used as such, thus directly on a plant or plant soil, as above described, or can be formulated in a composition.

In this regard, in an additional aspect, the present invention also concerns an anti-phytopathogenic composition comprising the lignin fraction for use as above described and suitable agro-chemical additives.

Said anti-phytopathogenic composition can be in a solid or liquid form.

When the anti-phytopathogenic composition is in a solid form, said solid form can be tablet, mini-tablet, micro-tablet, granule, micro-granule, pellet, multiparticulate, micronized particulate, or powder.

When the anti-phytopathogenic composition is in a solid form, said solid form comprises up to 99 wt % of lignin fraction, preferably, 5-90 wt % of lignin fraction.

When the anti-phytopathogenic composition is in a liquid form, said liquid form can be solution, emulsion, dispersion, suspension, gel, drops, or spray.

When the anti-phytopathogenic composition is in a liquid form, said liquid form comprises up to 50 wt % of lignin fraction, preferably, 1-25 wt % of lignin fraction. This means that the composition is a concentrate that can be suitably diluted in water before use on a plant or plant soil.

Suitable agro-chemical additives are pH adjusters, acidity adjusters, water hardness adjusters, mineral oils, vegetal oils, fertilizers, leaf manures, emulsifying agents, tackifiers, wetting agents, and combinations thereof.

The anti-phytopathogenic composition can further comprise a solvent.

Suitable solvents are water, glycols, alcohols, polyalcohols, aldehydes, ketones, organic acids, DMSO, and combinations thereof.

Preferred solvents are water, methanol, ethanol, n-propanol, iso-propanol, n-butanol, isobutanol, allyl alcohol, 1,2-propylene glycol, 1,3-propylene glycol, 1,2-ethylene glycol, polyethylene glycol (PEG), benzyl alcohol, glycerol, acetone, lactic acid, polylactic acid, DMSO, and mixtures thereof.

More preferred solvents are water, 1,2-propylene glycol, 1,3-propylene glycol, 1,2-ethylene glycol, polyethylene glycol (PEG), and mixtures thereof.

The anti-phytopathogenic compositions above described can be used in a method of protecting plants against phytopathogens, said method comprising the steps of:

a) providing the anti-phytopathogenic composition of the invention, and
b) applying the anti-phytopathogenic composition to a plant or plant soil.

In step a), the anti-phytopathogenic composition is provided in a solid or liquid form, as above described.

In step b), the anti-phytopathogenic composition can be applied as such, i.e. in the form provided in step a), or can be preliminarily diluted in water.

In some embodiments, in step b), the anti-phytopathogenic composition is in a solid form, e.g. in a powder form, and is spread as such on a plant or plant soil.

In other embodiments, the application of the anti-phytopathogenic composition, in step b), is performed by first diluting the composition in water and then spraying the resulting solution on a plant, at different times during the development of the plants, according to the parameters of pathogen growth, or on plant soil, e.g. before or upon sowing. More preferably, in step b), the dilution of the composition in water results in a lignin fraction concentration of less than 1,000 g/100 l of water, preferably less than 500 g/100 l of water.

Preferably, the anti-phytopathogenic composition is applied at least once a year.

More preferably, the anti-phytopathogenic composition is applied 1-10 times a year to a plant.

In preferred embodiments of the method, the anti-phytopathogenic composition of step b) is applied to a plant so as to achieve a lignin fraction quantity lower than 20,000 grams/ha, preferably lower than 5,000 grams/ha, more preferably a quantity of 2,000-4,000 grams/ha. In particularly preferred embodiments, the anti-phytopathogenic composition of step b) is applied to a plant so as to achieve a lignin fraction quantity of 3,000 grams/ha.

More preferably, the anti-phytopathogenic composition is applied 1-3 times a year to plant soil.

In preferred embodiments of the method, the anti-phytopathogenic composition of step b) is applied to plant soil so as to achieve a lignin fraction quantity lower than 100,000 grams/ha, preferably lower than 50,000 grams/ha, more preferably at a quantity of 20,000-40,000 grams/ha. In particularly preferred embodiments, the anti-phytopathogenic composition of step b) is applied to plant soil so as to achieve a lignin fraction quantity of 30,000 grams/ha.

It should be understood that all aspects identified as preferred and advantageous for the use of lignin fraction are to be deemed as similarly preferred and advantageous also for the methods of protecting plants, the anti-phytopathogenic compositions, and the uses of the same.

It should be also understood that all the combinations of preferred aspects of the use of lignin fraction of the invention, as well as of the methods of protecting plants, the anti-phytopathogenic compositions, and the uses of the same, as above reported, are to be deemed as hereby disclosed.

Below are working examples of the present invention provided for illustrative purposes.

EXAMPLES $M_w$ and $M_n$ in these Examples have been measured by Size-Exclusion Chromatography according to the following procedure.

Reagents and Materials
Eluent: 0.1 M NaOH, flow 0.5 ml/min
Calibration for RI detector: Pullulan standards, $M_p$: 100,000-1,080 (six standards), where $M_p$ is peak maximum molecular weight
Calibration for UV-detector (280 nm): PSS standards, polystyrenesulfonate sodium salt, $M_p$ 65,400-891 (six standards). Standards are dissolved into ultra pure water, concentration should be approximately 5 mg/ml. Injection volume is 20 µl.
Quality control samples: lignin with known $M_w$ distribution is used.
Equipment and Instruments
Dionex Ultimate 3000 Autosampler, column compartment, and pump
Dionex Ultimate 3000 Diode Array Detector
Reflective Index detector: Shodex RI-101
Columns: PSS MCX columns: precolumn and two analytical columns: 1000 Å and 100 000 Å, column material is sulfonated divinylbenzen copolymer matrix.
Syringe filters 0.45 µm and glass sample bottles for STD samples. Sample filtration: Mini-Uniprep syringeless filter device PTFE or Nylon, 0.45 µm. For prefiltration 5 µm syringe filter if needed.
Measuring bottles
Procedure
Preparation of the eluent
Ideally, water used to prepare eluents should be high quality deionized water of low resistivity (18 MΩ·cm or better) that contains as little dissolved carbon dioxide as possible. The water must be free of biological contamination (e.g., bacteria and molds) and particulate matter.
Needle washing with 10% MeOH-water
Liquid samples
Strong alkaline liquor samples are diluted 1:100 and filtered with PTFE syringe filters (0.45 µm) to vials. Solid lignin samples are diluted and dissolved into 0.1 M NaOH and filtered with PTFE, 0.45 µm syringe filters. Ready samples are load into autosampler. Injection volume is 20 µl. After samples 1 M NaOH is injected as a sample to clean the column.
Instrument Parameters:
Flow rate 0.5 ml/min
Eluent 0.1 M NaOH
Column oven temperature 30° C.
Isocratic run
Run time 48 minutes
Solid Samples
Solid samples (lignin) are dried overnight in an oven at 60° C., if needed. Approximately 10 mg is weighed into a 10 ml measuring bottle. Sample is dissolved and diluted into 0.1 M NaOH solution and filled into a mark. Sample is filtered with PTFE, 0.45 µm filters. If sample does not dissolve properly, it can be put in a ultrasound water bath or sample can be filtered through a 5 µm syringe filter.

Standard Samples for Calibration

Approximately 50 mg of each standard is weighed into a 10 ml measuring bottle and ultrapure water is added and filled into a mark. Standards are filtered with PTFE 0.45 µm syringe filters. After running the calibration samples, calibration results are integrated and processed in the processing method and saved. Calibration is linear 1st order calibration.

Quality Control Samples

For lignin samples, lignin with known $M_w$ distribution is used as a quality control sample. Lignin is dissolved into 0.1 M NaOH and the concentration is approximately 1 mg/ml.

Example 1

The following lignin fraction has been extracted from Kraft black liquor, said lignin fraction having the following characteristics:

>95% of total solids
Single Species: Southern Pine

| | |
|---|---|
| $M_w$ | 4400-5000 Da (24-28 phenylpropane units) |
| $M_n$ | 1200-1300 Da (6-7 phenylpropane units) |

Structures of OH-groups:

| | |
|---|---|
| aliphatic | 2.1 mmol/g |
| carboxylic | 0.5 mmol/g |
| condensated and syringyl | 1.7 mmol/g |
| guaiacyl | 2.0 mmol/g |
| catecholic and p-OH-phenyl | 4.0 mmol/g |

Example 1a 100 g of the lignin fraction (10% w/w) above has been hot-mixed with 840 g of 1,3-propylene glycol, and 60 g of NH$_4$OH (solution at 30%).

The mixture has been cooled to room temperature and then filtered off, thus obtaining a black solution (shortly referred to as "OX11").

Example 1b 100 g of the lignin fraction (10% w/w) above has been hot-mixed with 840 g of 1,3-propylene glycol, and 60 g of NaOH (solution at 30%).

The mixture has been cooled to room temperature and then filtered off, thus obtaining a black solution (shortly referred to as "OX10").

Example 2

Organosolv lignin obtained from Beech wood (*Fagus sylvatica*) was subjected to a base-catalysed depolymerization ('BCD'). The BCD process is run at 280° C. and 250 bar for 8 minutes at pH 12-14. The resulting lignin product consisted of a liquid fraction and a solid fraction.

These fractions were then separated.

The liquid lignin fraction was an oil and had the following characteristics:
Single Species: *Fagus sylvatica*

| | |
|---|---|
| $M_w$ | 100-300 Da (1-2 phenylpropane units) |
| phenols | 0% |
| guaiacols | 15-20% |
| syringols | 50-60% |
| catechols and metoxycatecols | 5-10% |
| oligomers/unknown | 15-30% |

The solid lignin fraction had the following characteristics:
Single Species: *Fagus sylvatica*

| | |
|---|---|
| $M_w$ | 800-1,500 Da (4-8 phenylpropane units) |
| $M_n$ | 300-700 Da (2-4 phenylpropane units) |

Structures of OH-groups:

| | |
|---|---|
| aliphatic | 0.2-0.4 mmol/g |
| carboxylic | 0.3-0.5 mmol/g |
| condensated and syringyl | 1.0-2.0 mmol/g |
| guaiacyl | 0.4 mmol/g |
| catecholic and p-OH-phenyl | 1.0-1.8 mmol/g |

Example 2a 50 g of the oily lignin fraction (5% w/w) above has been mixed with 950 g of 1,3-propylene glycol, and warmed at 40-50° C.

The mixture has been cooled to room temperature, thus obtaining a viscous solution (shortly referred to as "LMW12").

Example 2b 100 g of the solid lignin fraction (10% w/w) above has been hot-mixed with 800 g of 1,3-propylene glycol, and 100 g of $NH_4OH$ (solution at 30%).

The mixture has been cooled to room temperature and then filtered off, thus obtaining a black solution (shortly referred to as "LMW11").

Example 2c 100 g of the solid lignin fraction (10% w/w) above has been hot-mixed with 835 g of 1,3-propylene glycol, and 65 g of KOH (solution at 20%).

The mixture has been cooled to room temperature and then filtered off, thus obtaining a black solution (shortly referred to as "LMW10").

Example 3

The anti-phytopathogenic activity of the products of Examples 1-2 was evaluated through in vitro test of antimicrobial susceptibility with broth microdilution method (CLSI protocol—Clinical and Laboratory Standards Institute). The Minimum Inhibitory Concentrations (MICs) of seven products (Blank, LMW 12, LMW 11, LMW 10, OX 12, OX 11 e OX 10) were determined in multiwell plates, where Blank is 1,3-propylene glycol only.

The anti-phytopathogenic activity of products was tested on the microorganisms (bacteria and fungi) listed below:

Specific Screening Biocontrol

| Bacteria | Fungi |
|---|---|
| *Erwinia amylovora* | *Fusarium solani* |
| *Xanthomonas arboricola* | *Alternaria solani* |
| *Xanthomonas campestris* | *Botrytis cinerea* |
| | *Monilia laxa* |

Results

The pH of the tested products has been measured and registered as follows:

| Product | pH |
|---|---|
| Blank | 5.7 |
| LMW12 | 3.4 |
| LMW11 | 10.5 |
| LMW10 | 7.0 |
| OX11 | 10.3 |
| OX10 | 13.1 |

Due to the high variability of this parameter and to the possible high influence on growth performance of the microorganisms considered, several trials have been set up, testing the compounds without any correction, and adjusting the pH to 7 or 8.

All the tests have been carried out in triplicate, giving very similar inhibition results. The results are summarized into the tables below.

The minimum concentration (µg/ml) of lignin fraction for each product at which the bacterium is inhibited

| | E. amylovora | X. campestris | X. arboricola |
|---|---|---|---|
| Blank | na | na | na |
| Blank pH 7 | na | na | na |
| Blank pH 8 | na | na | na |
| LMW12 | 5 | 45 | 295 |
| LMW12 pH 7 | 145 | 295 | 295 |
| LMW12 pH 8 | 45 | 45 | 195 |
| LMW11 | 48 | 90 | 780 |
| LMW11 pH 7 | 90 | 1170 | 390 |
| LMW11 pH 8 | 390 | 390 | 590 |
| LMW10 | 90 | 290 | 590 |
| LMW10 pH 7 | 90 | 290 | 590 |
| LMW10 pH 8 | 190 | 390 | 590 |
| OX10 | 190 | 190 | 1560 |
| OX10 pH 7 | 780 | 1170 | 780 |
| OX10 pH 8 | 390 | 390 | 3120 |
| OX11 | 190 | 390 | 3120 |
| OX11 pH 7 | 2340 | 1560 | 3120 |
| OX11 pH 8 | 390 | 390 | 6250 |

The minimum concentration (µg/ml) of lignin fraction for each product at which the fungus is inhibited

| | F. solani | M. laxa | A. solani | B. cinerea |
|---|---|---|---|---|
| Blank | na | na | na | na |
| Blank pH 7 | na | na | na | na |
| Blank pH 8 | na | na | na | na |
| LMW12 | 780 | 780 | 45 | 195 |
| LMW12 pH 7 | 1560 | 2345 | 195 | 195 |
| LMW12 pH 8 | 780 | 585 | 95 | 95 |
| LMW11 | 3120 | 1560 | 3120 | 190 |
| LMW11 pH 7 | 3120 | 3120 | 3120 | 590 |
| LMW11 pH 8 | 1560 | 1560 | 1560 | 780 |
| LMW10 | 3120 | 4690 | 2340 | 590 |

-continued

The minimum concentration (μg/ml) of lignin fraction for each product at which the fungus is inhibited

|  | F. solani | M. laxa | A. solani | B. cinerea |
|---|---|---|---|---|
| LMW10 pH 7 | 3120 | 4690 | 2340 | 590 |
| LMW10 pH 8 | 3120 | 780 | 1560 | 390 |
| OX10 | 6250 | 3120 | 1560 | 3120 |
| OX10 pH 7 | 9400 | 9400 | 1560 | 1560 |
| OX10 pH 8 | 18700 | 6250 | 1560 | 780 |
| OX11 | 3120 | 1560 | 1560 | 3120 |
| OX11 pH 7 | 18700 | 6250 | 3120 | 1560 |
| OX11 pH 8 | 6250 | 3120 | 1560 | 780 |

In conclusion, in the following tables is represented a rank of the activities:

|  | E. amylovora | X. campestris | X. arboricola |
|---|---|---|---|
| LMW12 | **** | **** | *** |
| LMW11 | **** | *** | ** |
| LMW10 | *** | *** | *** |
| OX11 | *** | *** | ** |
| OX10 | *** | *** | ** |

|  | F. solani | M. laxa | A. solani | B. cinerea |
|---|---|---|---|---|
| LMW12 | ** | ** | **** | *** |
| LMW11 | ** | ** | ** | *** |
| LMW10 | ** | ** | ** | *** |
| OX11 | ** | ** | ** | ** |
| OX10 | * | ** | ** | ** |

The stars above represent a range of minimum concentration (μg/ml) of lignin fraction for each product at which the bacterium/fungus is inhibited:
*=from 250,000 to 6,250;
**=from 4,690 to 780;
***=from 590 to 90;
****=from 73 to 12.

The invention claimed is:

1. A method of protecting plants against phytopathogens, said method comprising the steps of:
i) providing a lignin fraction as an anti-phytopathogenic agent against a bacterium, fungus, oomycetes, or virus, said lignin fraction comprising fragments having a weight average molecular weight up to 5,500 Daltons, as measured by Size-Exclusion Chromatography, and having a number average molecular weight up to 2,000 Daltons, as measured by Size-Exclusion Chromatography, and
ii) applying the lignin fraction to a plant or plant soil.

2. The method of claim 1, wherein the lignin fraction comprises fragments having a weight average molecular weight up to 5,000 Daltons.

3. The method of claim 1, wherein the lignin fraction comprises fragments having a number average molecular weight up to 1,500 Daltons.

4. The method of claim 1, wherein the lignin fraction of step i) is dispersed in water at a concentration of less than 1,000 g/100 l of water.

5. The method of claim 1, wherein the lignin fraction in step ii) is applied to a plant at a quantity lower than 20,000 grams/ha, or the lignin fraction in step ii) is applied to plant soil at a quantity lower than 100,000 grams/ha.

6. An anti-phytopathogenic composition comprising:
a lignin fraction as an anti-phytopathogenic agent against a bacterium, fungus, oomycetes, or virus, said lignin fraction comprising fragments having a weight average molecular weight up to 5,500 Daltons, as measured by Size-Exclusion Chromatography, and having a number average molecular weight up to 2,000 Daltons, as measured by Size-Exclusion Chromatography, and agro-chemical additives.

7. The anti-phytopathogenic composition of claim 6, wherein the lignin fraction comprises fragments having a weight average molecular weight up to 5,000 Daltons.

8. The anti-phytopathogenic composition of claim 6, wherein the lignin fraction comprises fragments having a number average molecular weight up to 1,500 Daltons.

9. The anti-phytopathogenic composition of claim 6, comprising the lignin fraction in an amount up to 500 grams per kg of the composition itself.

10. The anti-phytopathogenic composition of claim 6, further comprising a solvent selected from water, ethanol, n-propanol, iso-propanol, n-butanol, isobutanol, allyl alcohol, 1,2-propylene glycol, 1,3-propylene glycol, 1,2-ethylene glycol, polyethylene glycol (PEG), benzyl alcohol, glycerol, DMSO, and mixtures thereof.

11. A method of protecting plants against phytopathogens, said method comprising the steps of:
a) providing an anti-phytopathogenic composition comprising a lignin fraction as an anti-phytopathogenic agent against a bacterium, fungus, oomycetes, or virus, said lignin fraction comprising fragments having a weight average molecular weight up to 5,500 Daltons, as measured by Size-Exclusion Chromatography, and having a number average molecular weight up to 2,000 Daltons, as measured by Size-Exclusion Chromatography, and agro-chemical additives, and
b) applying the anti-phytopathogenic composition to a plant or plant soil.

12. The method of claim 11, wherein the lignin fraction comprises fragments having a weight average molecular weight up to 5,000 Daltons.

13. The method of claim 11, wherein the lignin fraction comprises fragments having a number average molecular weight up to 1,500 Daltons.

14. The method of claim 11, comprising the lignin fraction in an amount up to 500 grams per kg of the composition itself.

15. The method of claim 11, wherein the anti-phytopathogenic composition further comprises a solvent selected from water, ethanol, n-propanol, iso-propanol, n-butanol, isobutanol, allyl alcohol, 1,2-propylene glycol, 1,3-propylene glycol, 1,2-ethylene glycol, polyethylene glycol (PEG), benzyl alcohol, glycerol, DMSO, and mixtures thereof.

* * * * *